United States Patent
Vaithilingam et al.

(10) Patent No.: US 8,621,614 B2
(45) Date of Patent: Dec. 31, 2013

(54) MANAGING POTENTIALLY PHISHING MESSAGES IN A NON-WEB MAIL CLIENT CONTEXT

(75) Inventors: Gandhi Vaithilingam, Sunnyvale, CA (US); Cheng Ho, Santa Clara, CA (US); Gruia Pitigoi-Aron, San Jose, CA (US); Ben Vincent, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 12/472,094

(22) Filed: May 26, 2009

(65) Prior Publication Data

US 2010/0306845 A1 Dec. 2, 2010

(51) Int. Cl.
| G06F 9/00 | (2006.01) |
| G06F 11/00 | (2006.01) |
| H04L 29/06 | (2006.01) |
| G06F 11/30 | (2006.01) |

(52) U.S. Cl.
USPC .................. 726/22; 726/12; 726/23; 726/25; 713/154; 713/188

(58) Field of Classification Search
USPC .................. 726/22, 12, 23, 25; 713/154, 188
See application file for complete search history.

(56) References Cited

U.S. PATENT DOCUMENTS

| 6,052,709 | A * | 4/2000 | Paul .............................. 709/202 |
| 6,161,130 | A * | 12/2000 | Horvitz et al. ................ 709/206 |
| 7,461,339 | B2 | 12/2008 | Liao |
| 7,490,131 | B2 | 2/2009 | Maller |
| 7,739,337 | B1 * | 6/2010 | Jensen .......................... 709/206 |
| 8,135,778 | B1 * | 3/2012 | Chin et al. .................... 709/206 |
| 2006/0101120 | A1 | 5/2006 | Helsper |
| 2006/0123464 | A1 | 6/2006 | Goodman et al. |
| 2006/0184632 | A1 * | 8/2006 | Marino et al. ................ 709/206 |
| 2007/0101423 | A1 | 5/2007 | Oliver et al. |
| 2007/0157113 | A1 * | 7/2007 | Bishop et al. ................ 715/786 |
| 2007/0220607 | A1 | 9/2007 | Sprosts et al. |
| 2009/0044006 | A1 | 2/2009 | Shim |
| 2009/0063371 | A1 | 3/2009 | Lin |

OTHER PUBLICATIONS

The Phishing Guide http://www.ngssoftware.com/papers/NISR-WP-Phishing.pdf.
Phishtrap http://www.phishtrap.com/howitworks.html.
Software Listing of Author: "Officialspamfilter.com" http://www.sharewareconnection.com/author.php?name=officialspamfilter.com.

(Continued)

*Primary Examiner* — Mohammad W Reza
(74) *Attorney, Agent, or Firm* — Shook Hardy & Bacon LLP

(57) ABSTRACT

Computer-readable media and computerized methods for governing treatment of digital communications (e.g., emails and instant messages) upon identifying the communications as potentially phishing emails are provided. A service provider is employed to control behavior of an account that is assigned to an intended recipient of the communications. Controlling the behavior of the account is described in the context of a non-web mail server that renders a UI display, which is not dynamically configurable by the service provider. In one solution, controlling behavior alerts a user to the presence of communications identified as potentially phishing by aggregating these communications in a separate folder. In another solution, controlling behavior facilitates protecting the user by replacing the content of the potentially phishing communications with a warning message. This warning message optionally includes a URL link to a web browser where the user can view the original content of the potentially phishing communications.

20 Claims, 6 Drawing Sheets

(56) References Cited

OTHER PUBLICATIONS

Behavior-based Email Analysis with Application to Spam Detection http://www1.cs.columbia.edu/~sh553/publications/final-thesis.pdf.
MailMarshal http://www.dcb.be/file.asp?filetype=doc&download04/002/mailmarshalwhitepaperuk.pdf.
Phishing Email Protection in Outlook http://www.sonicwall.com/in/anti-spam-desktop.html.
International Search Report and Written Opinion, International Application PCT/US2010/035202, mailed Dec. 6, 2010.

* cited by examiner

MANAGING POTENTIALLY PHISHING MESSAGES IN A NON-WEB MAIL CLIENT CONTEXT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Various techniques exist that enable service providers to receive and process messages (e.g., emails, short message service (SMS) messages, and the like) from various sources and allow users to view and take action on those messages. At times, the sources may be nefarious entities, such as criminals or illegal computer programs, that transmit messages to users that fraudulently induce disclosure of the user's personal information. This process of inducing disclosure of information via fraudulent messages is commonly referred to as phishing. Often, "phishing" is characterized as the criminally fraudulent process of attempting to acquire sensitive information (e.g., usernames, passwords, credit card details, etc.) by masquerading as a trustworthy entity in an electronic communication; thus, luring unsuspecting users to provide, what is otherwise, guarded information. In instances, phishing is carried out by sending an email or instant message, whose look and feel is similar to a legitimate email or instant message, to a user that directs the user to navigate to a fake website (i.e., spoofed website of a bank), and baiting the user into entering private information (e.g., bank account logon, user identification, social security number, and the like) at the fake website.

Service providers have taken steps to identify these phishing messages. Further, if the service providers have identified a message as a phishing message, the service providers may attempt to mitigate the damage potentially caused by the phishing message. However, when a client-side application that is not associated with the service provider is being used to access messages in the user's account, service providers fail to provide the user with adequate protection from the phishing message. That is, because most elements of the client-side application are not directly controlled by the service provider, the service provider is restrained from employing conventional techniques that inform the user of the phishing email.

As such, these present techniques are not configured to offer users adequate protective measures against phishing messages. Accordingly, employing a procedure to limit potential damage that a phishing message can cause when viewed from a client-side application, or a non-web mail client, would enhance the user's experience when viewing and taking action on messages in his/her account.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and computerized methods for governing treatment of digital messages (e.g., email messages, instant messages, and the like) upon identifying them as potentially phishing emails. In an exemplary embodiment, a service provider is employed to control behavior of an account that is assigned to an intended recipient of the digital messages. Controlling the behavior of the account may encompass a variety of operations. However, each of these operations is implemented in the context of a non-web mail server. That is, the intended recipient accesses his/her account via a user interface (UI) display being rendered by the non-web mail server. Generally, the service provider is unable to exert control over, or tailor the configuration of, the UI display because the non-web mail client lacks extension protocol to allow the service provider to manipulate aspects of the UI display. Accordingly, conventional techniques for warning the intended recipient of digital messages identified as potentially phishing emails are ineffective.

In one embodiment, an operation for controlling the behavior of the account includes appending a metadata tag to the digital messages identified as potentially phishing emails and aggregating them in a storage location that is dedicated to persist the tagged digital communications in isolation from digital messages identified as legitimate emails. This dedicated storage location maps to, and may be published as, a folder on the UI display. Upon selection of the folder, representations (e.g., metadata of content and digital communication properties) of the tagged digital communications allocated to the dedicated storage location are posted to the recipient. Accordingly, the recipient is alerted to an unsafe status of the tagged digital communications without directly manipulating the UI display.

Further, user-initiated actions that are directed toward the representations of the tagged digital communications may be limited. For instance, a request by the recipient to invoke actions that are predetermined as restricted (e.g., command attempting to move a tagged digital communication, reply command, reply to all command, and forward command) are failed by the service provider in order to protect the security of recipient. By way of example, failing the action may include the steps of intercepting the request, ascertaining that the action is classified as a restricted action, ascertaining that the digital communication to which the action is directed is tagged as a potentially phishing email, and failing to implement the action. Upon failing the action, an operation-fail indication (i.e., known error code) is transmitted to the non-web mail client, which, in turn, notifies the recipient that the action was not carried out by the service provider. Accordingly, the recipient is reminded of the unsafe status of the tagged digital communication. Moreover, these security measures provide a layer of protection against distributing tagged digital communications that could harm other users, even though the non-web mail client does not support antiphishing features.

In another embodiment, an operation for controlling the behavior of the account includes replacing the digital communications that are identified as potentially phishing emails with warning messages. In one instance, the warning message conveys a notification that the identified digital communication may be a potentially phishing email. In another instance, the warning message provides directions to access content of the identified digital communication via a web browser. In still another instance, the warning message includes a uniform-resource locator (URL) link to a web browser that, upon selection by the recipient, allows the recipient to access content of the identified digital communication at the service provider. Accordingly, by presenting the warning message to the recipient and abstaining from revealing the content of the identified digital communication, the recipient is informed of the unsafe status of the digital communication and blocked from inadvertently navigating to a compromised website.

BRIEF DESCRIPTION OF THE DRAWINGS

The present invention is described in detail below with reference to the attached drawing figures, wherein.

DETAILED DESCRIPTION

Figure 1:
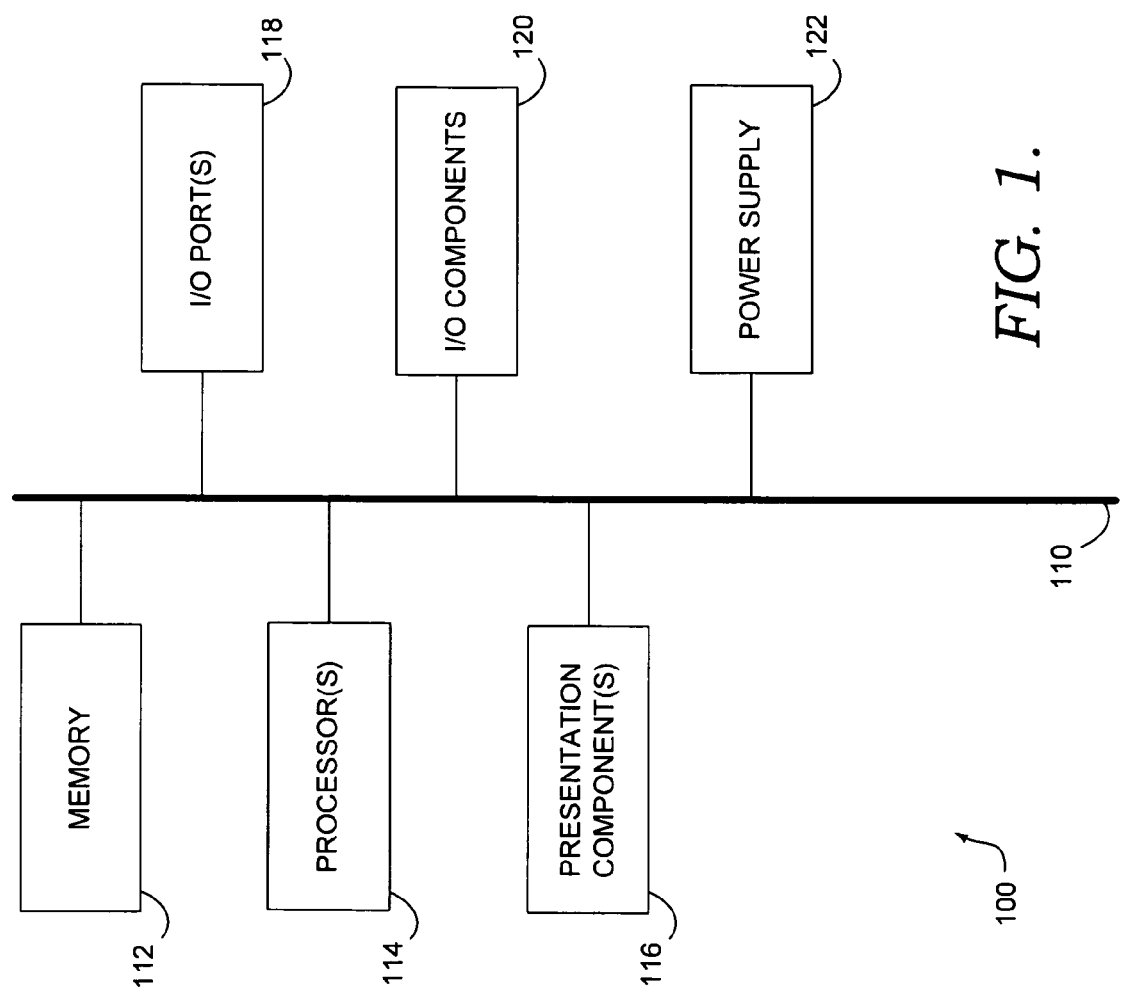
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Accordingly, in one embodiment, the present invention relates to computer-executable instructions, embodied on one or more computer-readable media, that perform a method for alerting a user of a potentially phishing email upon the user accessing an account via a non-web email client. Initially, the method involves receiving a digital communication at the account associated with the user. Incident to identifying the digital communication as a potentially phishing email, a metadata tag is appended to the digital communication. Next, the tagged digital communication is placed within, or associated with, a storage location that is dedicated to persist digital communications that are identified as potentially phishing emails. The visual representation of the storage location is presented to the user upon the user accessing the account via the non-web email client. In embodiments, the visual representation provides an indication to the user that potentially phishing emails have arrived at the user's account and have been identified as having an unsafe status.

In another embodiment, aspects of the present invention involve a computerized method, implemented at a server, for managing treatment of one or more digital communications when accessed via a non-web mail client. The method includes the steps of detecting a receipt of a digital communication at an account associated with an intended recipient of the digital communication, and upon receiving the digital communication, applying filtering heuristics to determine whether the digital communication is an uninvited message or a legitimate message. When the digital communication is determined to be an uninvited message, the digital communication is marked as unsafe. The unsafe digital communication is replaced with a warning message upon receiving a user-initiated request to access the unsafe digital communication. In embodiments, the warning message may function to perform at least one of the following services: convey a notification that the unsafe digital communication is identified as a potentially phishing email; provide directions to access content of the unsafe digital communication via a web browser; or provide a uniform-resource locator (URL) link to a web browser that, upon selection, allows the recipient to access content of the unsafe digital communication.

Eventually, the non-web mail client is instructed to surface a representation of the unsafe digital communication in a listing rendered in a user interface (UI) display. Typically, the listing includes one or more representations of digital communications determined to be legitimate messages. In one instance, the UI display rendered by the non-web mail client cannot be reconfigured by the service provider that manages the user's account. Upon receiving a user-initiated selection of the representation of the unsafe digital communication, instructions are communicated to the non-web mail client to present the warning message to the recipient and withhold revealing content of the unsafe digital communication.

In yet another embodiment, the present invention encompasses one or more computer-readable media that have computer-executable instructions embodied thereon that, when executed, perform a method for notifying a user, via a user-interface (UI) display rendered by a non-web mail client, that a potentially phishing email has arrived at an account of the user. In an exemplary embodiment, the method includes generating a storage location that is dedicated to persist one or more digital communications identified as potentially phishing emails. The non-web mail client is instructed to render a folder within the UI display. Generally, the folder maps to the dedicated storage location.

In one instance, instructing the non-web mail client to render the folder within the UI display includes the procedure of instructing the non-web mail client to render the folder in a listing that includes other folders that map to storage locations that persist digital communications identified as legitimate emails. As such, the potentially phishing emails are visually separated from the legitimate emails.

At some time, an indication implemented by the user to access the folder is detected. Upon detection, the non-web mail client is instructed to render representations of the identified digital communications. In one instance, the representations include metadata related to content of the identified digital communications.

The method may further include the step of receiving an action initiated by the user that is directed toward the identified digital communications. If the action is recognized as a predefined restricted action, the user-initiated action is failed. In one instance, failing the user's action includes preventing the action from being executed. In addition, an operation-fail indication (e.g., standard error code) may be transmitted to the non-web mail client, where the operation-fail indication conveys notice of the failure of the action.

Generally, embodiments of the present invention relate to managing treatment of potentially phishing emails. As utilized herein, the phrase "potentially phishing emails" is not meant to be construed as limiting and may encompass any communications that are uninvited by a user. For instance, potentially phishing emails may comprise spam communications, junk instant messages, and phishing emails. As discussed above, phishing emails are sent to an account of an intended recipient from various sources with the intent to fraudulently induce disclosure of the recipients' personal information (e.g., usernames, passwords, credit card details, etc.). This inducement is effective because the phishing emails represent the source as a trustworthy entity. As such, unsuspecting recipients are lured to provide, what is otherwise, guarded information. Often, the phishing email has the look and feel that is similar to a legitimate email or instant message and serves to direct the user to navigate to a fake website (i.e., spoofed website of a bank) where the user is fraudulently solicited to divulge sensitive information (e.g., bank account logon, user identification, social security number, and the like). In other instances, the phishing email serves to bait the user into sending private information to the source of the phishing email or other nefarious entity.

Although the potentially phishing emails are referred to herein by the phrases "uninvited message," "tagged message," "unsafe digital communication," and "phishing email," each of these phrases should be considered to represent the common concept of "potentially phishing emails" described immediately above.

In an exemplary embodiment, the present invention pertains to managing the treatment of potentially phishing emails in the context of a non-web mail client. As utilized herein, the phrase "non-web mail client" is not meant to be construed as limiting, and may broadly refer to any program or application running on an end-user device (e.g., mobile device, computer, PDA, or any other client device) that cannot be governed like a web browser. That is, the user experience offered by the non-web mail client cannot be controlled by a service provider (e.g., Hotmail) running on a server remotely located from the end-user device. For instance, the elements of a UI display rendered by the non-web mail client cannot be tailored based on messages received at the service provider. By way of example, the UI display cannot be dynamically altered to inform the user of a potentially uninvited message (e.g., potentially phishing email), to warn the user of phishing content in an email, or to limit actions that a user can take on certain communications.

The lack of control over the non-web mail client is due, in part, to one or more of the following factors: the underlying protocol used to access the service provider has no semantics to mark a digital communication (i.e., mail message) as a potentially phishing email; the UI display rendered by the non-web mail client is not able to be manipulated by the service provider (the UI display cannot be reconfigured by the service provider that manages the user's account); and the non-web mail client lacks extensible protocol that would allow the client to support new features, such as an antiphishing warning. Accordingly, because the UI display of the non-web mail client (e.g., Thunderbird) is predetermined and cannot be dynamically managed by the service provider at will, conventional techniques for warning of, and protecting a user from, potentially phishing emails (e.g., altering a UI display of an inbox and providing a specialized toolbar) are unavailable.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

In some embodiments, the computing device 100 of FIG. 1 is configured to implement various aspects of the present invention. In one instance, these aspects relate to managing the treatment of potentially phishing emails upon detecting a user-initiated request to view the potentially phishing emails or upon receiving an action directed at the potentially phishing emails. In another instance, these aspects relate to separating the potentially phishing emails from emails identified as legitimate and presenting the potentially phishing emails in a manner that informs a user of a non-web mail client of their unsafe status.

Figure 2:
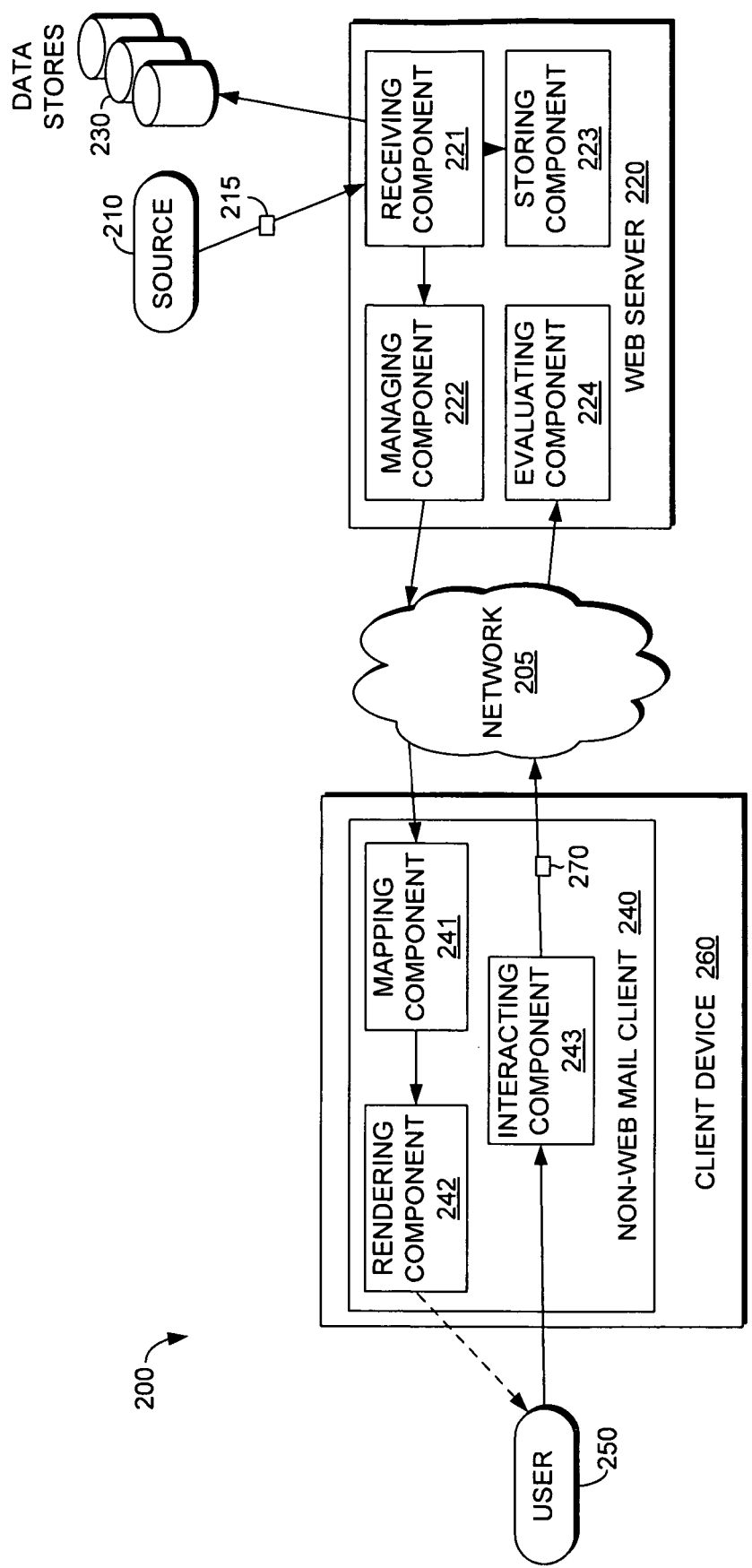
FIG. 2 is a block diagram illustrating a distributed computing environment, suitable for use in implementing embodiments of the present invention, that is configured to manage potentially phishing emails in the context of a non-web mail client.

These techniques for notifying a user that a digital communication is unsafe and for protecting the user from divulging personal information on account of a potentially phishing email will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to informing an intended recipient of a digital communication identified as a potentially phishing email so that the digital communication is marked with an unsafe status, and to limiting actions (e.g., viewing content, moving to another folder, replying or forwarding, and the like) that can be taken on the digital communication. It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes a source 210, a user 250, a client device 260, data stores 230 (i.e., structured searchable databases), a web server 220, and a network 205 that interconnects each of these items. Each of the client device 260, the data stores 230, and the web server 220, shown in FIG. 2, may take the form of various types of computing devices, such as, for example, the computing device 100 described above with reference to FIG. 1. By way of example only and not limitation, the client device 260 and/or the web server 220 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 260 and 220 includes, or is linked to, some form of computing unit (e.g., central processing unit, microprocessor, etc.) to support operations of the component(s) running thereon (e.g., receiving component 221, managing component 222, storing component 223, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 260 and 220 to enable each device to perform communication-related processes and other operations (e.g., detecting a digital communication at the receiving component 221 and identifying the digital communication as a potentially phishing email at the managing component 222). In another instance, the computing unit may encompass a processor (not shown) coupled to the computer-readable medium accommodated by each of the devices 260 and 220.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 260 and 220. Generally, resources refer to software components or hardware mechanisms that enable the devices 260 and 220 to perform a particular function. By way of example only, the resources accommodated by the web server 220 may include one or more of the following: a receiving component 221, a managing component 222, a storing component 223, and an evaluating component 224. One or more of these components may combine to provide particular functional aspects of a service provider (not shown). Generally, the service provider (e.g., Hotmail) manages aspects of a user's online account (e.g., email account), such as receiving, sending, organizing, and storing mail messages.

In another example, the resources accommodated by the client device 260 may include one or more of the following: a mapping component 241, a rendering component 242, and an interacting component 243. One or more of these components may combine to provide particular functional aspects of a non-web email client 240. Generally, the non-web email client (e.g., Thunderbird) renders a UI display that allows a user to access and manage the online account supported by the service provider.

The client device 260 may include an input device (not shown) and a presentation device (not shown). Generally, the input device is provided to receive input(s) affecting, among other things, a presentation of folders that include digital communications 215 and representations thereof, as well as actions directed toward one or more of the digital communications 215 persisted at the user's account. Illustrative devices include a mouse, joystick, key pad, microphone, I/O components 120 of FIG. 1, or any other component capable of receiving a user input and communicating an indication of that input to the client device 260.

In embodiments, the presentation device is configured to render and/or present a UI display thereon. The presentation device, which is operably coupled to an output of the client device 260, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device is configured to present rich content, such as a display area populated with representations of digital communications and folders. In another exemplary embodiment, the presentation device is capable of rendering content associated with digital communications identified as legitimate or warning messages associated with digital communications identified as potentially phishing emails. In yet another exemplary embodiment, the presentation device may present other forms of media (e.g., audio signals), or uniform resource locator (URL) links that are active (e.g., selectable by the user to navigate to a website) or deactivated.

The data stores 230 are generally configured to store information associated with persisting tags appended to digital communication(s) identified as the potentially phishing email(s). In other instances, the data stores 230 are configured to store a quarantine listing on computer-readable media accommodated by the data stores 230. Typically, the quarantine listing acts as an index that enumerates each of the digital communications identified as potentially phishing emails that have arrived at the user's account. In another embodiment, the quarantine listing includes a manifest of email IDs that have been marked as having an unsafe status (e.g., spyware, spam, phishing messages, infected emails, and the like).

In various embodiments, the information stored at the data stores 230 may include, without limitation, warning messages rendered in place of potentially phishing email content, the content of digital communications received at the user's account, filtering heuristics for determining whether a digital communication is unsafe, a list of restricted actions, and any other data that supports the operation of the service provider, as discussed herein. In addition, the data stores 230 may be configured to be searchable for suitable access of the stored information. For instance, the data store 230 may be searchable for digital communications associated with a storage location dedicated to persisting potentially phishing emails.

It will be understood and appreciated by those of ordinary skill in the art that the information stored in the data stores 230 may be configurable and may include any information relevant to the generation and maintenance of the dedicated storage location and the restricted actions. The content and volume of such information are not intended to limit the scope of embodiments of the present invention in any way. Further, though illustrated as single, independent components, the data stores 230 may, in fact, be a plurality of databases, for instance, a database cluster, portions of which may reside on the client device 260, the web server 220, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the devices 260 and 220, the data stores 230, and components 221, 222, 223, 224, 241, 242, and 243 as illustrated. In some embodiments, one or more of the components 221, 222, 223, 224, 241, 242, and 243 may be implemented as stand-alone devices. In other embodiments, one or more of the components 221, 222, 223, 224, 241, 242, and 243 may be integrated directly into the web server 220, or on distributed nodes that interconnect to form the web server 220. It will be understood by those of ordinary skill in the art that the components 221, 222, 223, 224, 241, 242, and 243 (illustrated in FIG. 2) are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one storing component 243 is shown, many more may be accommodated on the web server 220, embodied on the data stores 230, or communicatively coupled to the client device 260).

Further, the devices of the exemplary system architecture may be interconnected by any method known in the relevant field. For instance, the web server 220 and the client device 260 may be operably coupled via a distributed computing environment that includes multiple computing devices coupled with one another via one or more networks 205. In embodiments, the network 205 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 221, 222, 223, 224, 241, 242, and 243 are designed to perform a process that includes, at least, the steps of identifying the digital communication 215 from a source 210 as being a potentially phishing email, appending a tag (e.g., metadata) to the digital communication 215 that indicates the digital communication 215 has an unsafe status, and implementing solutions to protect and inform a user 250. These solutions include alerting the user 250 of the presence of a potentially phishing email and limiting the actions requested by the user 250 with regard to the potentially phishing email. In embodiments, the source 210 represents one or more nefarious entities, such as criminals or illegal computer programs, that transmit to the user 250 messages (e.g., digital communications 215) that fraudulently induce disclosure of the user's personal information. In embodiments, the user 250 represents any entity that is an intended recipient of the digital communication 215 distributed by the source 210. By way of example, the user 250 may be a person that owns/possesses the client device 260, that is associated with an account at the service provider, or that is capable of accessing the account via the non-web email client 240.

Initially, the receiving component 221 is responsible for accepting and detecting the digital communication 215 from the source 210. The receiving component 221 then passes the digital communication 215 to either the data stores 230 or the storing component 223 accommodated on the web server 220 for the purpose of persisting the digital communication 215 in association with the account of the user 250. In conjunction with facilitating storage of the digital communication 215, the receiving component 221 may pass the digital communication 215 to the managing component 222.

Upon receiving the digital communication 215, the managing component 222 is configured to perform a variety of operations. Initially, the operations comprise filtering unsafe and/or uninvited digital communications 215 from those that are legitimate. In one instance, the filtering operation identifies whether the digital communication 215 is a potentially phishing email and marks the digital communication 215 as such. The step of identifying the digital communication 215 as either unsafe or legitimate may be based on an analysis that employs filtering heuristics. These filtering heuristics, upon scanning incoming digital communications 215, determine whether the digital communication 215 arrived from a trustworthy site or a known source of harmful emails, and/or whether the contents of the digital communication are hostile or meet a threshold level of harm.

Based on one or more of these criteria immediately above, the digital communication 215 may be identified as being a potentially phishing email and marked as having an unsafe status. Because the filtering heuristics are not precise and sometimes erroneous (offering false positives based on attributes of the email), the digital communications 215 that are deemed unsafe are considered "potentially" phishing emails in order to allow the user 250 to make a final judgment on whether the digital communication 215 is truly safe, thereby verifying the actual quality of the email. This is opposed to identifying a message as a "phishing email," which may be automatically removed from the user's account without providing the user 250 an opportunity to validate the identification.

In embodiments, marking the digital communication 215 as being a potentially phishing email or as having an unsafe status involves appending a tag to the digital communication 215. This tag may comprise metadata that is stored in association with the digital communication 215 and used to govern where the digital communication 215 is stored and what actions directed toward the digital communication 215 are restricted.

Although one method for marking the digital communication 215 as unsafe or potentially phishing has been described, it should be understood and appreciated by those of ordinary skill in the art that other types of suitable flagging schemes that provide an indication of potential harm may be used, and that embodiments of the present invention are not limited to the appended metadata tag described herein. For instance, the unsafe digital communication 215 may be tracked by adding an identification of the unsafe digital communication 215 to a quarantine listing that enumerates each of the potentially phishing emails that have arrived at the user's account.

In other embodiments, the operations performed by the managing component 222 comprise generating a storage location, which is dedicated to persist the digital communications 215 that are identified as potentially phishing emails, upon ascertaining that the digital communication 215 is a potentially phishing email. If the dedicated storage location is already in existence, the digital communications 215 that are marked as unsafe (e.g., messages appended with a metadata tag) are placed in the dedicated storage location, or, at least, stored in association with the dedicated storage location. In one instance, the dedicated storage location is managed by the storing component 243 and occupies memory on the web server 220 and/or the data stores 230.

Generally, the dedicated storage location functions to provide a physical memory location that is separated from the memory location in which other digital communications (e.g., identified as legitimate messages) associated with the user's account are persisted. Accordingly, when the account is accessed by the user 250 via the non-web mail server 240, the mapping component 241 will detect the separate storage locations and produce folders that map to the separate storage locations, respectively. That is, the mapping component 241 is configured to arrange the folders in the UI display, or client view, to reflect the storage locations on the web server 220. By way of example, an "inbox" folder may be produced that maps to the storage location that holds legitimate messages, while a distinct "phishing mails" folder may be produced that holds the digital communications 215 identified as potentially phishing emails. In this way, the attention of the user 250 is drawn to the isolation of certain messages from a corpus of the received digital communications 215, thereby alerting the user 250 that unsafe or potentially phishing emails are present.

Upon generating the folders and populating the folders with appropriated digital communications 215 (based on a mapping between the storage locations and the folders), the rendering component 242 publishes the folders to a user at a UI display. In one instance, publishing may include posting a title of each of the folders, respectively. By way of example, the title "inbox" of the folder mapped to the storage location that holds legitimate messages may be positioned alongside a display of the inbox folder, while the title "phishing mails" of the folder mapped to the dedicated storage location may be positioned alongside a display of the phishing mails folder. Accordingly, the service provider is able to convey to the user 250 that certain messages are deemed unsafe, and to convey why user-initiated actions directed toward the unsafe messages persisted in the phishing mails folder are restricted—in the absence of being able to manipulate the UI display of a web browser. That is, surfacing the phishing mails folder is a mitigation of the problem inherent to the non-web mail client 240 of failing to inform a user of phishing acts, where the mitigation involves allowing the user 250 to view the phishing mail folder in the context of the inbox folder. Advantageously, the phishing mail folder provides the user 250 with a consistent, intuitive experience when navigating folders and is permissible within the confines of the non-web mail client 240.

As discussed more fully above, the UI display may be rendered at the presentation device that is operably coupled to the client device 260, on which the non-web mail client 240 is running. For instance, with reference to FIG. 6, an exemplary UI display 600 is rendered that includes a representation of an inbox folder 620 in proximity to a representation of a phishing mails folder 630 within a folder list 640. Upon selection of one of the folders 620 or 630, a representation of the digital communications 215 persisted in the folders 620 or 630, respectively, is displayed on the UI display 600. As shown in this illustration, the inbox folder 620 is selected. As such, a representation of some of the digital communications 215 stored in the inbox folder 620 are presented in the inbox 680. Accordingly, the user 250 understands that these digital communications 215 are identified as legitimate and are safe to view, save, send, etc.

Typically, the representations of the digital communications 215 are drawn from properties and/or content of the digital communications 215. For instance, the representations of the digital communications 215 may include a snapshot of the contents, a date, an identity of the sender, and/or a header that corresponds to a title or subject line of the digital communications 215, as depicted by representations of messages 665 and 675 in the inbox 680 of FIG. 6. Upon selection (e.g., mouse click) of a representation of the digital communication 215, the interacting component 243 transmits a command to the service provider to fetch the contents of the digital communication 215. The service provider then inspects the tag(s) appended to the digital representation to determine whether the digital communication 215 is marked as having an unsafe status or identified as a potentially phishing email. If identified as a potentially phishing email or unsafe, the service provider may determine whether to convey the content of the selected digital communication 215 to the non-web mail client 240 for rendering or replace the content with a warning message (see reference numeral 700 of FIG. 7).

In one solution, typically when it is ascertained that the user-initiated selection is directed toward a representation of a digital communication 215 that is marked as a potentially phishing email (by inspecting the metadata tag appended to the digital communication 215), and ascertaining that the digital communication 215 is persisted in the dedicated storage location, a portion of the content of the digital communication 215 is surfaced for examination by the user 250. In this solution, one or more uniform-resource locator (URL) links incorporated within the content of the potentially phishing email, which is persisted in the dedicated storage location, are deactivated. Accordingly, the user 250 is prevented from navigating to a fraudulent website via the potentially phishing email, but can still evaluate whether the potentially phishing email is truly unsafe or uninvited upon inspecting the content thereof. Advantageously, disabling the URL links reduces the user's exposure to a potentially dangerous site (e.g., spoofed site) and effectively mitigates damage, both financial and personal, that may be caused upon attempting to visit the site.

In a second solution, typically when it is ascertained that the user-initiated selection is directed toward a representation of a digital communication 215 that is marked as a potentially phishing email, and that the digital communication 215 is persisted in a common storage location that includes legitimate communications (mapped to the inbox folder), the content of the selected digital communication 215 is replaced with a warning message that may be surfaced for examination by the user 250. In this solution, the warning message serves to inform the user 250 that the selected digital communication 215 is considered to have an unsafe status, in lieu of employing the dedicated storage location (mapped to the phishing mails folder) to notify the user 250 of possible harm. Because the content of the selected digital communication 215 is not revealed, the warning message may optionally include instructions and/or a URL link that, upon selection, navigate the user 250 to a web browser. The web browser allows the user 250 to view the content of the selected digital communication 215 in a protected environment that is dynamically controlled by the service provider and can issue alerts and other security measures while the user 250 is interacting with the selected digital communication 215. Accordingly, the user 250 is substantially prevented from navigating to a fraudulent website by hiding the potentially phishing email, but can still access the contents of the potentially phishing email at the web browser to ascertain whether it is truly unsafe or uninvited.

In an exemplary embodiment, the user 250 may attempt to perform an action with respect to one or more digital communications 215 identified as potentially phishing emails. In one instance, the user 250 may attempt to impose a "move" action on a digital communication marked as unsafe. By way of example, the move action may include an attempt to move the unsafe digital communication from the dedicated storage location to a storage location that holds digital communications identified as legitimate. In embodiments, the move action may be transmitted as a request 270 at a time proximate to the user 250 invoking the move or at a time when the non-web mail client 240 and the service provider are synchronized.

This move action may be transmitted within the request 270 via the interacting component 243 to the evaluating component 224 of the service provider. Typically, the evaluating component 224 intercepts the request 270 initiated by the user (e.g., applied at the UI display) and determines whether the move action is targeting an unsafe digital communication. If so, the evaluating component 224 determines whether the move action appears on a list of restricted actions. If so, the evaluating component 224 disallows movement of the unsafe digital communication outside the dedicated storage location. Accordingly, upon synchronization, a representation of the unsafe digital communication is returned into the phishing mails folder, which maps to the dedicated storage location, thereby informing the user that the digital communication is deemed to continue to have an unsafe status. In other words, the user 250 cannot move unsafe digital messages from the phishing mails folder to any other folder and have the move reflected on the web server 220. Even in instances where a move action is permitted, exiting the unsafe digital communication from the dedicated storage location does not affect the metadata tag and related functionality associated with the unsafe digital message.

In another instance, the user 250 may attempt to direct another restricted action toward a digital communication marked as unsafe. By way of example, these restricted actions comprise one or more of a reply command, a reply to all command, and a forward command. Although several different commands have been described as restricted actions, it should be understood and appreciated by those of ordinary skill in the art that other types of suitable commands issued by a user that target digital messages are contemplated as being restricted actions (e.g., save command, edit command, and the like), and that embodiments of the present invention are not limited to those commands described herein Upon administering the restricted action on an unsafe digital communication, the restricted action may be transmitted within the request 270 via the interacting component 243 to the evaluating component 224. Again, the evaluating component 224 intercepts the request 270 and determines whether the restricted action is targeting an unsafe digital communication. By way of example, determining whether an unsafe, or potentially phishing, digital communication is targeted involves checking the quarantine list to ascertain whether the identification of the selected digital communication appears therein. In another example, determining whether an unsafe digital communication is targeted involves inspecting the selected digital communication to ascertain whether the digital communication is appended with a tag that marks the digital communication as a phishing message.

Generally, the metadata tag appended to the selected digital communication governs how the digital communication is treated and whether an action submitted in the request 270 is honored. In addition, the metadata comprising the tag may be adjusted to allow certain actions and disallow others. Accordingly, the restricted actions may be specific to each digital message upon the filtering heuristics determining a level of risk associated with the digital messages individually and memorializing the level of risk as the metadata within the tag.

If an unsafe digital communication is being targeted by the user 250, the evaluating component 224 disallows execution of the action in whole or in part. In one instance, failing the execution of the action includes failing a command to "reply to" or "forward" the digital communication 215. Further, an operation-fail indication, or a known error code, is sent to the non-web mail client 240 in response to the failed request 270. In one instance, the operation-fail indications is substantially similar to those generated and transmitted upon the service provider encountering a real error when carrying out an action, as opposed to this case where the failure to execute the restricted action is intentional. In another instance, sending the operation-fail indication involves returning to the non-web mail client 240 an error code that is already known to thereby. In this instance, the non-web mail client 240 may automatically convey a message, a visual indicator (e.g., pop-up display), or other expression to the user 250 that the user-administered action failed. Accordingly, the failure message or the indicator reinforces that the digital communication selected by the user 250 is identified as a potentially phishing email.

In addition, by limiting the user actions that may be administered to the unsafe digital communications, the service provider controls the distribution and impact of a potentially phishing email. Advantageously, in light of the above security measures that work within the confines of the web-mail client 240 that does not support any antiphishing features, user safety is ensured as the user 250 is prohibited from responding to a potentially phishing mail.

Figure 3:
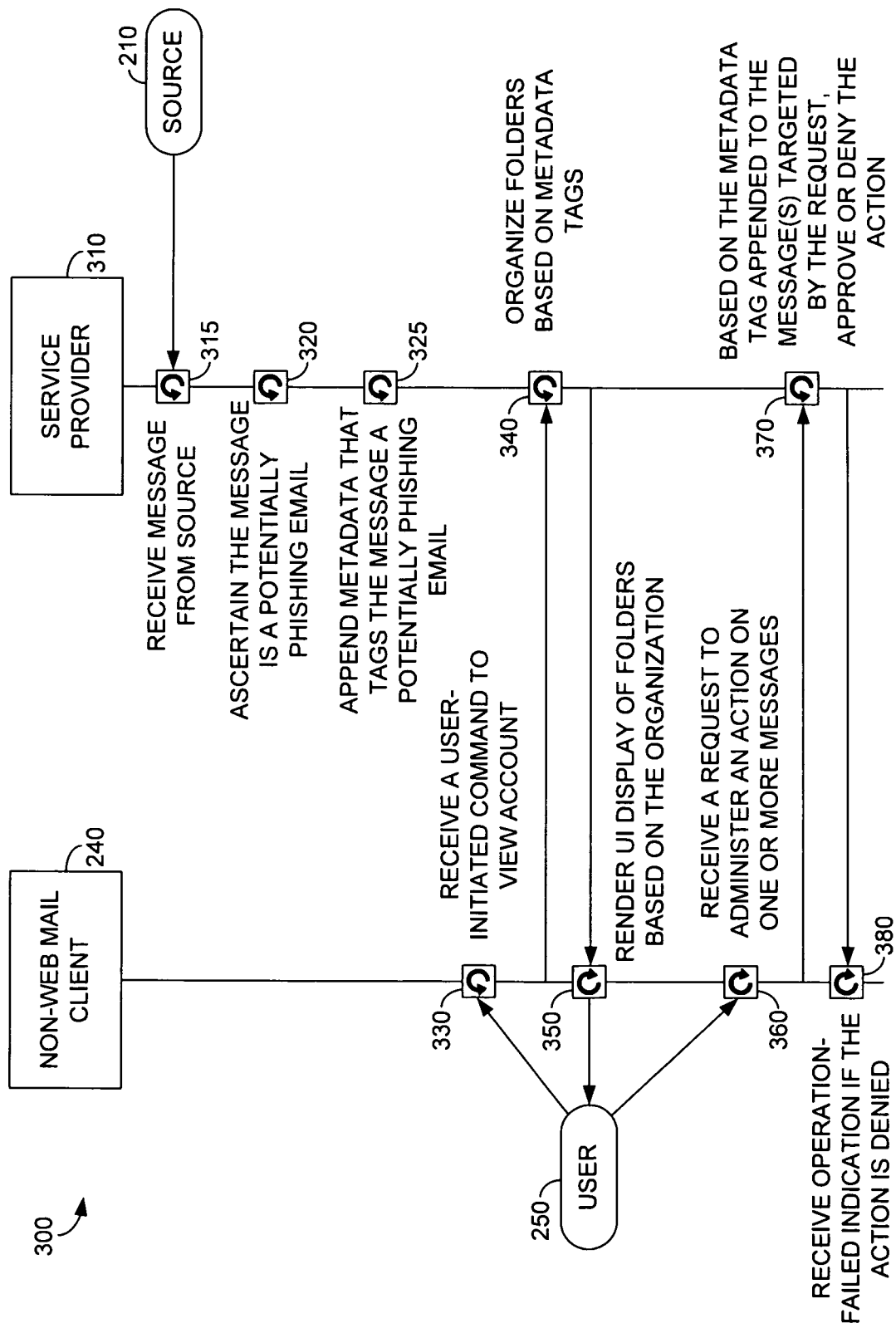
FIG. 3 is an operational flow diagram illustrating a high-level overview of a technique for identifying and organizing potentially phishing emails of one embodiment of the present invention.

Turning now to FIG. 3, an operational flow diagram 300 illustrating a high-level overview of a technique for identifying and organizing potentially phishing emails of one embodiment of the present invention is depicted. Although the terms "step" and/or "block" may be used herein to connote different elements of methods employed, the terms should not be interpreted as implying any particular order among or between various steps herein disclosed unless and except when the order of individual steps is explicitly described.

Initially, the flow diagram 300 shows a service provider 310 that performs several operations. The service provider 310 may be supported by the web server 220 of FIG. 2 or any other hardware that is remote from the non-web mail client 240. The operations performed by the service provider 310 include receiving a message (e.g., the digital communication 215 of FIG. 2) from the source 210 (see step 315) and ascertaining whether the message is a potentially phishing email (see step 320). Upon ascertaining that the message is a potentially phishing email, the service provider 310 appends to the message a metadata tag that identifies the message as a potentially phishing email, as depicted at step 325.

With reference to the first solution articulated above, the tagged message may be stored in a storage location dedicated to persisting potentially phishing emails and presented to the user 250 in a phishing mail folder on the UI display rendered by the non-web mail client 240. With reference to the second solution articulated above, the tagged message may be stored in a common storage location in conjunction with legitimate messages and presented to the user 250 in an inbox folder on the UI display rendered by the non-web mail client 240. However, a user-initiated selection of a representation of the tagged message will retrieve from the service provider a warning message that replaces the original content of the tagged message.

As depicted at step 330, a user-initiated command to view an account associated with the user 250 is received at the non-web mail client 240 and conveyed to the service provider 310. By way of example, the view command may be automatically sent upon the user 250 logging into and activating the account. Upon receiving the view command, the service provider 310 organizes folders such that they are mapped to the established storage locations and populates the folders with appropriate messages based on the metadata tagged thereto, as depicted at step 340. The organized folders are rendered by the non-web mail client 240 and published on a UI display, as depicted at step 350. These organized folders serve to inform the user 250 the status (safe or unsafe) attached to the messages populated in each folder.

Eventually, a request (such as the request 270 of FIG. 2) may be received from the user 250 to administer an action on one or more of the messages. This is depicted at step 360. This request is sent to the service provider 310, which determines whether to honor the request based on at least the two following criteria: whether the metadata appended to message(s) targeted by the request indicate the message(s) are identified as potentially phishing emails; and whether the action administered is a restricted action. If either of the criteria are not met, then the action is carried out. Otherwise, the restricted action is not implemented on the message(s) that are identified as potentially phishing emails. This is depicted at step 370. When the action is not implemented, or denied, an operation-failed indication is sent to the non-web mail client 240, as depicted at step 380.

Figures 4, 5:
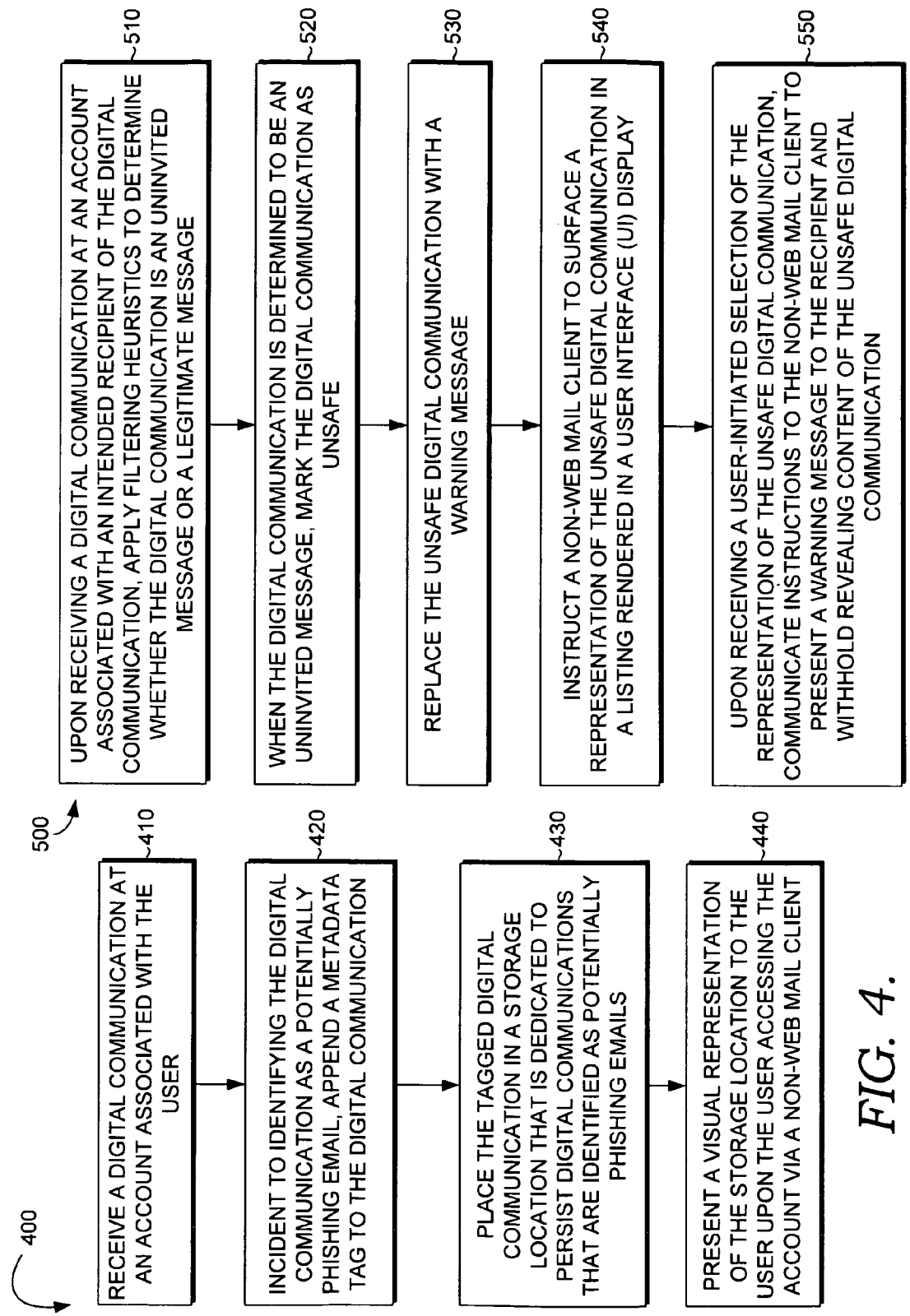
FIG. 4 is a flow diagram illustrating an overall method for alerting a user of a potentially phishing email upon the user accessing an account via a non-web email client, in accordance with an embodiment of the present invention.
FIG. 5 is a flow diagram illustrating an overall method for managing treatment of one or more digital communications when accessed via a non-web mail client, in accordance with an embodiment of the present invention.

With reference to FIG. 4, is a flow diagram illustrating an overall method 400 for alerting a user of a potentially phishing email upon the user accessing an account via a non-web mail client is shown, in accordance with an embodiment of the present invention. Initially, the method 400 involves receiving a digital communication at the account associated with the user, as depicted at block 410. Incident to identifying the digital communication as a potentially phishing email, a metadata tag is appended to the digital communication, as indicated at block 420. Next, the tagged digital communication is placed within, or associated with, a storage location that is dedicated to persist digital communications that are identified as potentially phishing emails, as indicated at block 430. The visual representation of the storage location is presented to the user upon the user accessing the account via the non-web mail client, as indicated at block 440. In embodiments, the visual representation provides an indication to the user that potentially phishing emails have arrived at the user's account and have been identified as having an unsafe status.

With reference to FIG. 5, a flow diagram illustrating an overall method 500 for managing treatment of one or more digital communications when accessed via a non-web mail client is shown, in accordance with an embodiment of the present invention. Initially, the method 500 includes detecting receipt of a digital communication at an account associated with an intended recipient of the digital communication. As depicted at block 510, upon receiving the digital communication, filtering heuristics are applied to determine whether the digital communication is an uninvited message or a legitimate message. When the digital communication is determined to be an uninvited message, the digital communication is marked as unsafe, as depicted at block 520. The unsafe digital communication is replaced with a warning message upon receiving a user-initiated request to access the unsafe digital communication, as depicted at block 530. In embodiments, the warning message may function to perform at least one of the following services: convey a notification that the unsafe digital communication is identified as a potentially phishing email; provide directions to access content of the unsafe digital communication via a web browser; or provide a uniform-resource locator (URL) link to a web browser that, upon selection, allows the recipient to access content of the unsafe digital communication.

Eventually, as depicted at block 540, the non-web mail client is instructed to surface a representation of the unsafe digital communication in a listing rendered in a user interface (UI) display. Typically, the listing includes one or more representations of digital communications determined to be legitimate messages. In one instance, the UI display rendered by the non-web mail client cannot be reconfigured by the service provider that manages the user's account. Upon receiving a user-initiated selection of the representation of the unsafe digital communication, instructions are communicated to the non-web mail client to present the warning message to the recipient and withhold revealing content of the unsafe digital communication. This is depicted at block 550.

Figure 6:
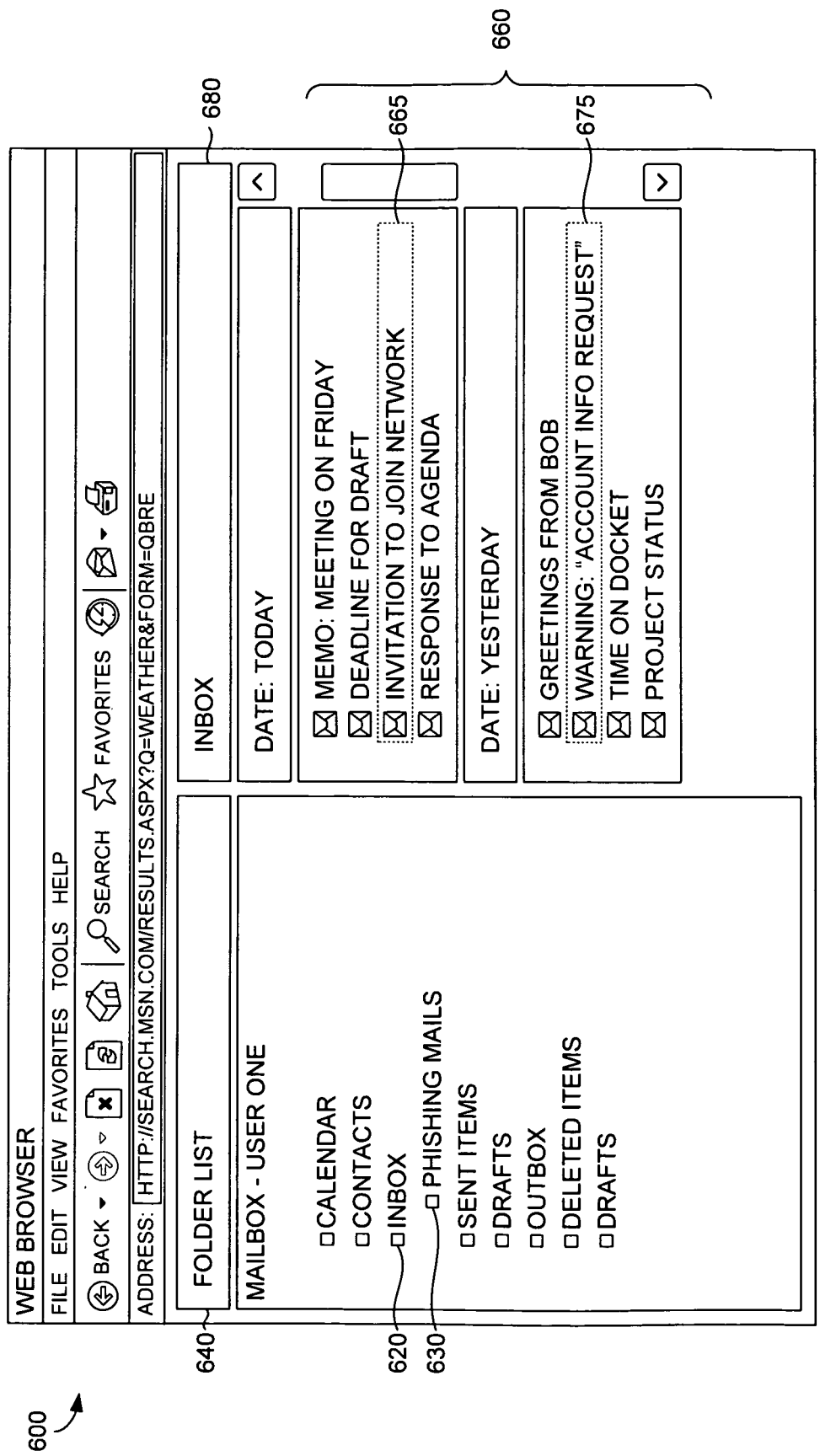
FIG. 6 is an illustrative screen display of an exemplary user interface for presenting a folder that maps to a storage location that is dedicated to persist potentially phishing emails.

With reference to FIG. 6, an illustrative screen display of exemplary user interface 600 for presenting a folder that maps to a storage location that is dedicated to persist potentially phishing emails is shown. As discussed above, the inbox folder 620 and the phishing mails folder 630 may be displayed in a folder list 640. In embodiments, the organization of the folders 620 and 630 map to the management of the storage locations at the service provider, while the messages that are included in the folders 620 and 630, respectively, map to the messages that are populated into the separate storage locations (e.g., dedicated and common), respectively.

Further, representations of messages 660 may be displayed on the user interface 600. In one embodiment, the representations of messages 660 that are appended with a metadata tag that indicates an unsafe status are presented only upon accessing the phishing mails folder 630. On the other hand, in the embodiment illustrated at FIG. 6, the representations of messages 665 and 675 that are appended with a metadata tag that indicates an unsafe status are presented in a listing of the messages 660 in the inbox 680 upon accessing the inbox folder 620. That is, the tagged messages and the legitimate messages are persisted in a common storage location and populated to a common folder, such as the inbox folder 620. Accordingly, in order to inform the user that these representations of messages 665 and 675 that are appended with a metadata tag are identified as potentially phishing emails, a warning message is surfaced upon the user attempting to open and view the messages 665 and 675.

Figure 7:
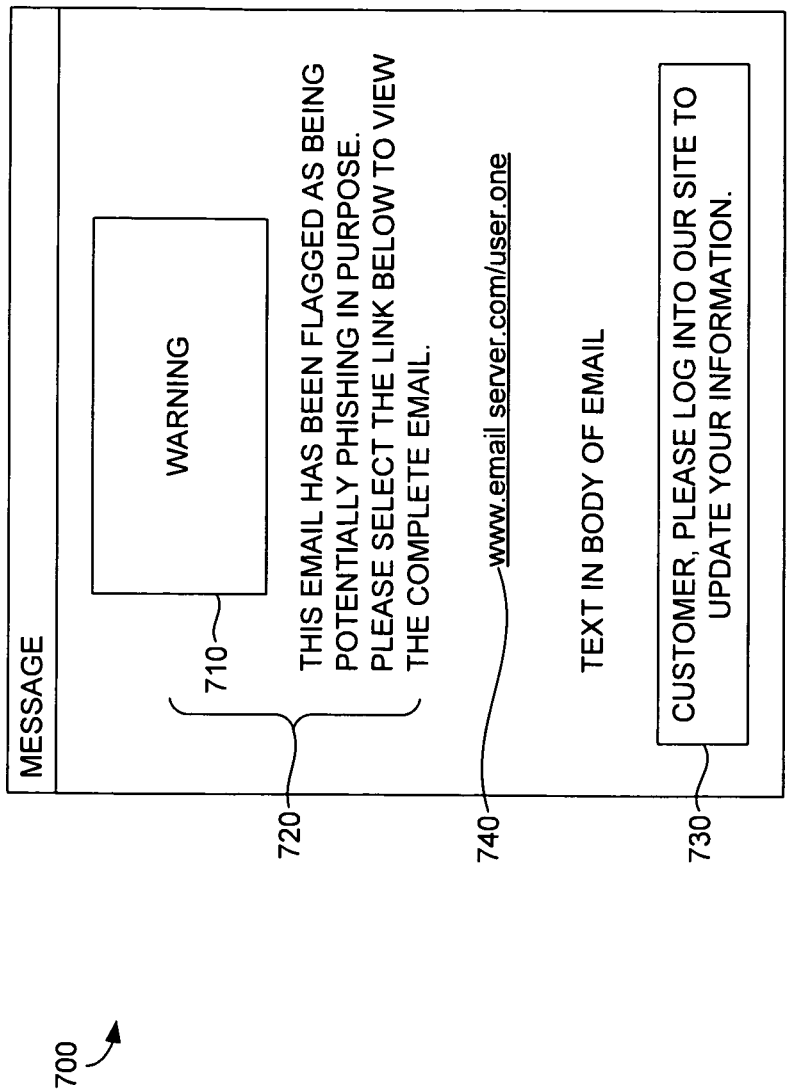
FIG. 7 is an illustrative screen display of an exemplary user interface for presenting a warning message that is rendered in lieu of revealing content of a potentially phishing email.

Turning now to FIG. 7, an illustrative screen display of an exemplary user interface for presenting a warning message 700 that is rendered in lieu of revealing content of a potentially phishing email is shown. As discussed above, according to the second solution, the content of a tagged message that is selected for viewing is replaced with the warning message 700, which is displayed to the user by the non-web mail client. As such, the warning message specifically serves to alert the user of potential risk associated with this message. The warning message 700 in embodiments, may include an explicit warning posting 710 to immediately inform the user that a selected message is associated with an unsafe status. Further, the warning message 700 may include an explanation 720 for replacing the original content with the warning message 700 and/or directions that clearly delineate the steps a user should take to view the original content. In one instance, the directions may indicate that the user should log into a web browser to view the original content of the tagged message. In this instance, no URL link is provided in the body of the warning message 700. Advantageously, by omitting the URL link, any opportunity for a fraudulent actor to use a URL link within a fake warning message as a phishing vector is avoided.

In another instance, as illustrated in FIG. 7, a URL link 740 is surfaced in the warning message 700. Selection of the URL link 740 navigates the user to a web browser that will allow the user to view the original content of the selected message to verify whether the message is properly identified as a potentially phishing email. Typically, the web browser includes antiphishing controls making it a safe forum for viewing possible phishing content.

In yet another instance, the warning message 700 is specifically tailored. In one embodiment, the warning message 700 is specifically tailored based on information related to the user attempting to view the tagged message, wherein the information is pulled from sources accessible to the service provider. By way of example, language of the warning message 700 is tailored to the user based on an indication of the region/market that the user is associated with, where the indication of the user's region/market is pulled from the user's online profile. In a second embodiment, the warning message 700 is specifically tailored based on information related to the tagged message, wherein the information is pulled from the original content or properties of the tagged message. By way of example, a passage of content 730 from the tagged message is surfaced in the warning message 700.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable device having computer-executable instructions embodied thereon that, when executed, perform a method for alerting a user of a potentially phishing email upon the user accessing an account via a non-web mail client, the method comprising:
receiving a digital communication at the non-web mail client associated with the user, wherein the non-web mail client has no association with a service provider;
incident to identifying the digital communication as a potentially phishing email, appending a metadata tag to the digital communication;
placing the tagged digital communication in a first storage location that is dedicated to persist digital communications that are identified as potentially phishing emails, wherein the first storage location provides a physical memory location separate from a second storage location that persists digital communications identified as legitimate; and
presenting a visual representation of the first storage location to the user upon the user accessing the account via the non-web mail client, wherein the visual representation provides an indication to the user that one or more potentially phishing emails have arrived at the user's account.

2. The one or more computer-readable device of claim 1, wherein the method further comprises persisting the appended tag in association with the digital communication identified as the potentially phishing email in a quarantine listing on the one or more computer-readable media, wherein the quarantine listing enumerates each of the one or more potentially phishing emails that have arrived at the user's account.

3. The one or more computer-readable device of claim 1, wherein the method further comprises applying filtering heuristics to ascertain whether the digital communication is the potentially phishing email, wherein the potentially phishing email is a message that fraudulently solicits the user to divulge personal information.

4. The one or more computer-readable device of claim 3, wherein the method further comprises generating the first storage location upon ascertaining that the digital communication is the potentially phishing email.

5. The one or more computer-readable device of claim 1, wherein the digital communication comprises at least one of an email message or an instant message, and wherein the digital communication is received from a source that is removed from the one or more computer-readable device.

6. The one or more computer-readable device of claim 1, wherein the non-web mail client provides the user access to the account by rendering a user interface (UI) display to the user, wherein elements published on the UI display are not controlled by the service provider that manages the user's account.

7. The one or more computer-readable device of claim 6, wherein the method further comprises intercepting a request initiated by the user, via the UI display, to perform an action with respect to the potentially phishing email.

8. The one or more computer-readable device of claim 7, the method further comprising:
   ascertaining that the user-initiated request is directed toward the digital communication identified as the potentially phishing email by inspecting the metadata tag appended to the digital communication; and
   ascertaining whether the action that is communicated in the request is a restricted action.

9. The one or more computer-readable device of claim 8, wherein the method further comprising:
   upon ascertaining that the user-initiated request is directed toward the digital communication identified as the potentially phishing email and that the action that is communicated in the request is a restricted action, preventing execution of the action; and
   transmitting an operation-fail indication to the non-web mail client in response to the request.

10. The one or more computer-readable device of claim 9, wherein the restricted action comprises at least one of a reply command, a reply to all command, or a forward command.

11. The one or more computer-readable device of claim 1, wherein the action comprises a command attempting to move the digital communication from the first storage location to the second storage location, wherein the method further comprising:
   ascertaining that the action is the move-attempt command; and
   disallowing movement of the digital communication outside the first storage location.

12. The one or more computer-readable device of claim 1, wherein the method further comprises:
   presenting the visual representation of the first storage location as a folder on the UI display rendered by the non-web mail client; and
   upon receiving a selection of the folder, presenting representations of the one or more potentially phishing emails that have arrived at the user's account and that are persisted in the first storage location.

13. The one or more computer-readable device of claim 12, wherein the method further comprises:
   deactivating uniform-resource locator (URL) links incorporated within content of the one or more potentially phishing emails that are persisted in the first storage location;
   receiving a selection of the representations of the one or more potentially phishing emails; and
   conveying the content of the one or more selected potentially phishing emails to the non-web mail client for rendering.

14. A computerized method, implemented by a service provider accommodated on a server, for managing treatment of one or more digital communications when accessed via a non-web mail client, the method comprising:
   upon receiving a digital communication at the non-web mail client associated with an intended recipient of the digital communication, applying filtering heuristics to determine whether the digital communication is an uninvited message or a legitimate message, wherein the non-web mail client has no association with the service provider;;
   when the digital communication is determined to be an uninvited message, marking the digital communication as unsafe;
   replacing the unsafe digital communication with a warning message, wherein content of the unsafe digital communication is not revealed within the warning message;
   instructing the non-web mail client to surface a representation of the warning message within a listing rendered in a user interface (UI) display, wherein the listing includes one or more representations of digital communications determined to be legitimate messages, and wherein the UI display rendered by the non-web mail client cannot be reconfigured by the service provider that manages the user's account; and
   upon receiving a user-initiated selection of the representation of the warning message, communicating instructions to the non-web mail client to present the warning message to the recipient and withhold revealing content of the unsafe digital communication, wherein the warning message provides directions to access the content of the unsafe digital communication.

15. The computerized method of claim 14, further comprising persisting the unsafe digital communication in a storage location that holds one or more digital communications that are determined to be legitimate communications.

16. The computerized method of claim 14, wherein the warning message conveys a notification that the unsafe digital communication is identified as a potentially phishing email.

17. The computerized method of claim 14, wherein the warning message includes a uniform-resource locator (URL) link to a web browser that, upon selection, allows the recipient to access content of the unsafe digital communication.

18. One or more computer-readable device having computer-executable instructions embodied thereon that, when executed, perform a method for notifying a user, via a user-interface (UI) display rendered by a non-web mail client, that a potentially phishing email has arrived at an account of the user, the method comprising:
   generating a first storage location that is dedicated to persist one or more digital communications identified as potentially phishing emails, wherein the first storage location provides a physical memory location separate from a second storage location that persists digital communications identified as legitimate;
   instructing the non-web mail client to render a first folder within the UI display, wherein the first folder maps to the first storage location, wherein the non-web mail client has no association with a service provider;;
   detecting an indication implemented by the user to access the first folder; and
   instructing the non-web mail client to render representations of the one or more identified digital communications, wherein the representations include metadata related to content of the one or more identified digital communications.

19. The one or more computer-readable device of claim 18, wherein instructing the non-web mail client to render a first folder within the UI display comprises instructing the non-web mail client to render the first folder in a listing that includes a second folder that map to the second storage location that persists the digital communications identified as legitimate emails, thereby visually separating the potentially phishing emails from the legitimate emails.

20. The one or more computer-readable device of claim 18, wherein the method further comprises:

receiving an action initiated by the user that is directed toward the one or more identified digital communications;

failing the user-initiated action by preventing the action from being executed; and transmitting an operation-fail indication to the non-web mail client, wherein the operation-fail indication notifies of the failure of the action.

\* \* \* \* \*